G. A. RIGGS.
PHOTOGRAPHIC FILM SPOOL.
APPLICATION FILED JUNE 27, 1916.
1,269,003.
Patented June 11, 1918.
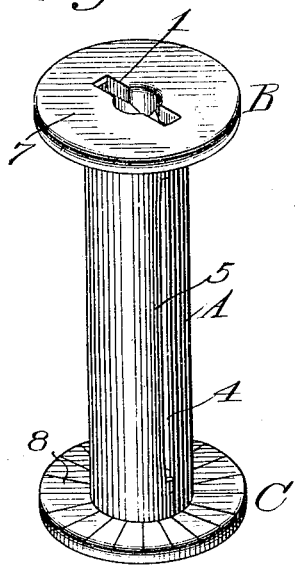
Fig. 1
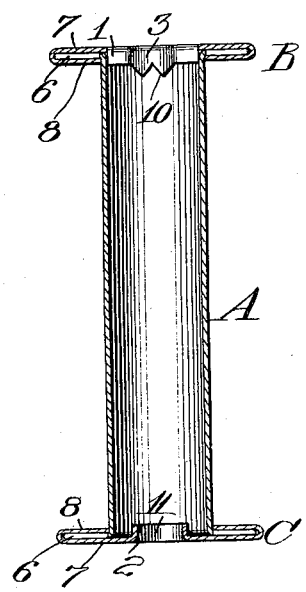
Fig. 2
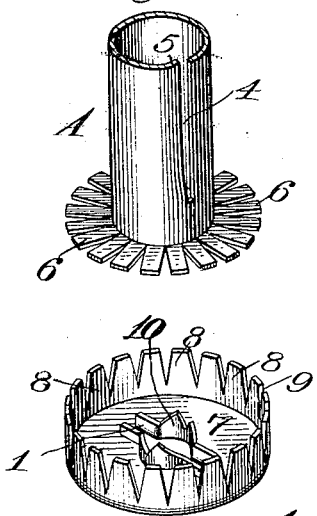
Fig. 3
Fig. 4
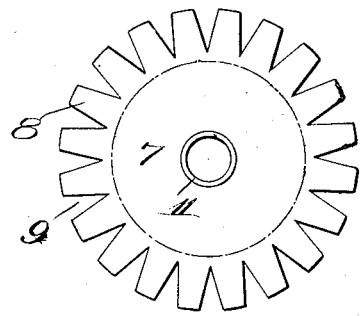
Fig. 5
WITNESSES
Nelson H. Copp
INVENTOR
Garshom A. Riggs
BY
his ATTORNEYS

UNITED STATES PATENT OFFICE.

GARSHOM A. RIGGS, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-FILM SPOOL.

1,269,003.  Specification of Letters Patent.  Patented June 11, 1918.

Application filed June 27, 1916. Serial No. 106,138.

*To all whom it may concern:*

Be it known that I, GARSHOM A. RIGGS, of Rochester, in the county of Monroe and State of New York, have invented certain new and useful Improvements in Photographic-Film Spools; and I do hereby declare the following to be a full, clear, and exact description of the same, reference being had to the accompanying drawings, forming a part of this specification, and to the reference-numerals marked thereon.

My present invention relates to photography and more particularly to photographic film spools and it has for its object to provide a simple, light, cheap and efficient spool composed of sheet metal that will be light-tight at the ends and otherwise fitted to support a roll of photographic film and preserve it in good condition. The purpose of the invention is, in part, to provide a construction of film spool that will permit of the spools being made in very small sizes in which the ordinary wooden construction of the core piece is not adaptable there being too little body to the wooden part to permit of a secure attachment to the end flanges. To these and other ends the invention resides in certain improvements and combinations of parts all as will be hereinafter more fully described, the novel features being pointed out in the claim at the end of the specification.

In the drawings:

Figure 1 is a perspective view of a film spool constructed in accordance with and illustrating one embodiment of my invention;

Fig. 2 is a longitudinal central section therethrough;

Fig. 3 is a fragmentary perspective of one end of the core piece;

Fig. 4 is a perspective view of the flange plate that coöperates with the part shown in Fig. 3, and Fig. 5 is a plan view of a blank for forming up one of the end flanges of the spool.

Similar reference numerals throughout the several views indicate the same parts.

Referring first more particularly to Figs. 1 and 2, the spool comprises generally, a core piece A and end flanges B and C. The end flange B has the usual elongated opening 1 to receive a properly configurated winding key while the end flange C is provided with a circular opening 2 to receive a film spool center, as usual, the central portion of the elongated opening 1 being also circular as shown at 3 to receive another film spool center on which the spool may idly turn when the latter is acting as the supply or feed roll.

The core piece A is tubular in form, as shown, being made of a single piece of sheet metal with one of the meeting edges notched to provide a slot 4 on the periphery of the core into which the lead end of the film or paper backing is thrust to attach it for winding purposes. In order that the bend in the film or paper at this point may not cause a ridge or lump on the surface of the roll, the material adjacent to the slot is preferably depressed as best shown in Fig. 3 at 5. At each end of the core the material of the tube is split at a plurality of points and bent outwardly in a radial direction as shown in Fig. 3 forming fan-like flanges 6 in a plane at right angles to the axis of the core.

Disposed against and on the outside of each of these flanged ends 6 is a disk or plate 7 the edges of which plates are provided with inturned notched flanges 8 that are formed up preliminarily as shown in Fig. 4 after being blanked out as shown in Fig. 5. The plurality of fingers produced by the notches 9 are slipped over the end portions 6 of the core and then crimped down as shown in Fig. 1, the notches 9 being so proportioned that a continuous surface (Fig. 1) will be produced on the inner face of each of the spool flanges B and C that are constituted jointly by the portions 6 and 7 on the respective parts. Finally, the assembled spool may be given a heavy coat of enamel to insure covering of all cracks or seeming irregularities but the flanges of the spool will inevitably be light-tight and prevent light from entering between the convolutions of the film because the disk 7 is continuous on the outside of the spool beyond the circumference of the core piece A and if the notches 9 are properly proportioned, the flanges or fingers 8 will fit very closely together. While the spool flanges B and C are, in fact, composed of hollow bodies by reason of the doubling of the material and the intervening portions 6 of the core that they embrace, they will not be found of undue thickness overall if light sheet material is used in the construction.

The relative sizes of the core A and the flanges B and C are such that the winding and centering apertures 1, 2 and 3 are comprised within the compass of the core tube, as shown in Fig. 2 and in punching these apertures, the adjacent material constituting their walls is turned inwardly as shown at 10 and 11 to project within the core piece A. This not only strengthens the spool, but it increases the area of the engaging surface with which either the winding key or the spool center contacts. Otherwise, only the edge of the sheet material would be presentable. As these lips or walls 10 and 11 are turned in, they also produce a rounded edge for the aperture that makes it easy to slip the key or centering devices therein.

I claim as my invention:

A photographic film spool composed of a tubular core having its ends turned radially to constitute attaching portions and flange plates composed of disks disposed against the ends of the core and having notched marginal flanges crimped over the said attaching portions to present continuously smooth surfaces on the inner faces of the spool flanges.

GARSHOM A. RIGGS.

Witnesses:
V. MacDonald,
R. H. Ruttan.